Patented Sept. 15, 1953

2,651,811

UNITED STATES PATENT OFFICE 2,651,811

PROCESS OF SOLVENT POLISHING-INJECTION MOLDED ARTICLES OF CELLULOSE ACETATE-BUTYRATE

Charles H. Coney, Kingsport, Tenn., assignor to Eastman Kodak Company, Rochester, N. Y., a corporation of New Jersey No Drawing. Application June 23, 1951,
Serial No. 233,254

3 Claims. (Cl. 18—48)

This invention relates to the solvent polishing of injection molded plastic articles, and more particularly to the solvent polishing of injection molded articles of cellulose acetate-butyrate.

When an attempt is made to polish injection molded articles of cellulose acetate-butyrate by immersing them briefly in an active solvent, the surface usually becomes wrinkled, due to surface strains present in all injection molded plastic articles molded under the usual conditions. If the thickness of the part is great enough, the surface wrinkling may be overcome by dipping for extended periods in the active solvent. However, this is usually impractical, because the surface detail is greatly reduced.

I have found a method by which the surfaces of injection molded cellulose acetate-butyrate articles can be satisfactorily solvent polished. This comprises softening the surface of the molded article in a solvent mixture which causes the softened portion to gel upon evaporation of a small portion of the solvent. Such a solvent mixture consists of approximately equal proportions of isopropyl alcohol and an aromatic hydrocarbon selected from the group consisting of toluene and xylene. The proportions can be varied to some extent without greatly altering the results. Best results are obtained when 50-55% of toluene or xylene is used.

The molded article is completely immersed in the solvent mixture for from 10 to 20 minutes, removed, and allowed to dry. The article can be handled after drying for about 15 minutes. The immersion time varies somewhat, depending upon the degree to which the surface is marred, the amount and degree of strains present in the surface of the molded article, and the size and shape of the molded article, and can best be determined by experimentation with the particular article to be polished.

Within the hydrocarbon: isopropyl alcohol ratios of from 40:60 to 60:40, the time required for the polishing of cellulose acetate-butyrate articles decreases as the percentage of toluene or xylene increases. Toluene-isopropyl alcohol mixtures give a somewhat faster polishing than do the corresponding xylene-isopropyl alcohol mixtures.

Injection molded strips of plasticized cellulose acetate-butyrate, roughened by rubbing with grit paper, required a longer time for polishing than did compression molded strips of the same composition, roughened in the same way. This is because of the molding strains in the injection molded articles. Release of these strains by solvent action produces a wrinkling effect requiring additional polishing time.

Injection molded cellulose acetate-butyrate articles polished in the above manner, for the correct period of time, attain a very high surface gloss; they do not blush; they do not show wrinkles or "orange peel"; and they do not suffer a great loss of surface detail. The fact that wrinkling is overcome and surface detail is unimpaired is attributed to the mechanism of the gelling effect caused by a small amount of solvent evaporation.

What I claim as my invention and desire to be secured by Letters Patent of the United States is:

1. A process of polishing injection molded cellulose acetate-butyrate articles, which consists in softening the surface of the article by immersing it in a solvent mixture consisting of 50-45% of isopropyl alcohol and 50-55% of a hydrocarbon selected from the group consisting of toluene and xylene for a period of from 10 to 20 minutes, removing the article from the solvent mixture, and allowing it to dry.

2. A process of polishing injection molded cellulose acetate-butyrate articles, which consists in softening the surface of the article by immersing it in a solvent mixture consisting of 50-45% of isopropyl alcohol and 50-55% of toluene for a period of from 10 to 20 minutes, removing the article from the solvent mixture, and allowing it to dry.

3. A process of polishing injection molded cellulose acetate-butyrate articles, which consists in softening the surface of the article by immersing it in a solvent mixture consisting of from 50—45% of isopropyl alcohol and 50—55% xylene for a period of from 10 to 20 minutes, removing the article from the solvent mixture, and allowing it to dry.

CHARLES H. CONEY.

References Cited in the file of this patent

UNITED STATES PATENTS

| Number | Name | Date |
|---|---|---|
| 1,808,098 | Briggs et al. | June 2, 1931 |
| 2,319,051 | Fordyce et al. | May 11, 1943 |
| 2,356,002 | Plumley et al. | Aug. 15, 1944 |
| 2,422,017 | Hunt | June 10, 1947 |

FOREIGN PATENTS

| Number | Country | Date |
|---|---|---|
| 615,179 | Great Britain | Jan. 3, 1949 |